United States Patent [19]

Sano et al.

[11] Patent Number: 5,179,155
[45] Date of Patent: Jan. 12, 1993

[54] ANTISTATIC MOLDED ARTICLE OF MONOMER-CAST NYLON

[75] Inventors: Saburo Sano; Yoichi Ebata, both of Hiratsuka, Japan

[73] Assignee: Nippon Polypenco Limited, Tokyo, Japan

[21] Appl. No.: 750,536

[22] Filed: Aug. 27, 1991

Related U.S. Application Data

[62] Division of Ser. No. 472,261, Jan. 30, 1990, Pat. No. 5,084,504.

[51] Int. Cl.$^5$ ............................ C08K 3/04; C08K 7/16
[52] U.S. Cl. .................................. 524/496; 524/495; 524/843; 523/223
[58] Field of Search ................... 524/495, 496, 847; 523/223

[56] References Cited

FOREIGN PATENT DOCUMENTS 0312688 4/1989 European Pat. Off. ............ 524/496
1029428 1/1989 Japan .................................. 524/496

Primary Examiner—Paul R. Michl
Assistant Examiner—Peter Szekely
Attorney, Agent, or Firm—Oblon, Spivak, McClelland, Maier & Neustadt

[57] ABSTRACT

An antistatic molded article of monomer-cast nylon, which contains from 2 to 40% by weight of spherical or substantially spherical fine carbon particles having a specific gravity of from 1.4 to 1.6 and an average particle size of from 5 to 25 μm.

7 Claims, No Drawings

ANTISTATIC MOLDED ARTICLE OF MONOMER-CAST NYLON

This is a division of application Ser. No. 07/472,261, filed on Jan. 30, 1990, now U.S. Pat. No. 5,884,504.

BACKGROUND OF THE INVENTION

1. Field of the Invention

The present invention relates to a molded article of monomer-cast nylon excellent in the antistatic properties.

2. Discussion of Background

A molded article of monomer-cast nylon can be obtained by polymerizing a monomer material such as ε-caprolactam in a mold.

Such a molded article of monomer-cast nylon is excellent in the mechanical properties and thus is useful for various mechanical parts such as gear wheels, wheels, rollers or screws.

However, the monomer-cast nylon has an electrical insulating property (its volume resistivity is from $10^{14}$ to $10^{15}$ Ω-cm). In its applications where static electricity is undesirable, it is desired to have antistatic properties imparted.

In order to impart antistatic properties to the monomer-cast nylon, it is conceivable to incorporate fine metal powder, metal fiber, carbon black or inorganic particles coated with a metal, to the monomer material. However, among such additives, the metal type has a problem that when a static mold method is employed as commonly employed in the case of usual monomer-casting, it tends to settle in the mold and can not uniformly be dispersed. In the case of carbon black, because of its large specific surface area, it adsorbs the monomer to form a paste. Therefore, it may be added only at a level of 5% by weight at best. Accordingly, its volume resistivity can be reduced only to a level of from $10^{10}$ to $10^{11}$ Ω-cm. Besides, the mechanical properties tend to be thereby impaired.

SUMMARY OF THE INVENTION

The present invention provides a molded article of monomer-cast nylon having carbon particles uniformly dispersed in the molded article by adding to the monomer material, spherical or substantially spherical fine carbon particles having a specific gravity of from 1.4 to 1.6 and an average particle size of from 5 to 25 μm instead of the carbon black, followed by polymerization.

Namely, the present invention provides an antistatic molded article of monomer-cast nylon, which contains from 2 to 40% by weight of spherical or substantially spherical fine carbon particles having a specific gravity of from 1.4 to 1.6 and a particle size of from 5 to 25 μm.

DETAILED DESCRIPTION OF THE PREFERRED EMBODIMENTS

The present invention is a molded article composed mainly of monomer-cast nylon having the specific fine carbon particles dispersed therein.

The monomer-cast nylon may be, for example, 6-nylon prepared from ε-caprolactam as the starting material, or 12-nylon prepared from ω-laurylolactam as the starting material.

The fine carbon particles to be added thereto are spherical or substantially spherical particles having a specific gravity of from 1.4 to 1.6 and an average particle size of from 5 to 25 μm. As such particles, Bell Pearl-C (manufactured by Kanebo, Ltd.) is available. This product is isotropic carbon particles obtained by baking and carbonizing spherical or substantially spherical particles of a phenol-formaldehyde resin.

Carbon black is usually an extremely fine random-shaped powder, and since its specific surface area is usually as large as 200 m$^2$/g or more, the amount of monomer adsorption is very large. Whereas, with the carbon particles used in the present invention, the specific surface area is as small as 10 m$^2$/g or less, it does not adsorb the monomer very much and therefore, can be added in a large amount.

Further, the specific gravity is from 1.4 to 1.6, which does not substantially differ from the specific gravity (1.0 or slightly less) of the monomer material such as ε-caprolactam. Therefore, the carbon particles do not settle like the conventional metal particles and can uniformly be dispersed.

Further, their average particle size is from 5 to 25 μm which is substantially larger than the carbon black. Therefore, they can be uniformly dispersed in the monomer without aggromeration.

The carbon particles are added usually in an amount of from 2 to 40% by weight, particularly preferably at least 5% by weight.

The molded article of the present invention can be obtained by adding to the monomer such as ε-caprolactam, an anion polymerization catalyst such as an alkali metal, an alkaline earth metal or a hydride of such a metal, a polymerization initiator such as an isocyanate compound, a carbodiimide or an N-substituted ethyleneimine derivative and the above-mentioned fine carbon particles, casting the mixture into a mold, and polymerizing the mixture at a temperature of from 120° to 200° C.

EXAMPLES

Into a stainless steel beaker, 2,000 g of dry ε-caprolactam was introduced and adjusted to a temperature of from 140° to 160° C. Then, 15 g of tolylene diisocyanate as a polymerization initiator and a predetermined amount of preheated fine carbon particles (Bell Pearl-C2000S, specific gravity: 1.4–1.6, average particle size: about 6 μm) were mixed thereto. On the other hand, into a separate beaker, 1,000 g of dry ε-caprolactam was introduced, and 3 g of a sodium hydride dispersion (63 wt. % in paraffin) as a polymerization catalyst was added, and the mixture was adjusted to a temperature of from 140° to 160° C.

Then, both mixtures were combined, mixed, cast into a mold of 150° C. and polymerized for 10 minutes. The molded product taken out from the mold was a plate having a thickness of 15 mm, a width of 300 mm and a length of 400 mm. This plate was divided into three equal portions in the longitudinal direction (i.e. the direction of the height of the mold). Test specimens having a predetermined size were cut out from the upper portion, the intermediate portion and the lower portion, and the following properties were evaluated. The results are shown in Table 1.

(1) Volume resistivity (Ω-cm)

With respect to a test specimen having a size of 100 mm×100 mm and a thickness of 5 mm, the volume resistivity was measured by High Resistance Meter 4329A (manufactured by Yokogawa-Hewlett-Packard, Ltd.) for a resistance exceeding $10^6$ Ω-cm, or by Digital Multimeter 3478A (manufactured by Yokogawa-Hewlett-Packard, Ltd.) for a resistance of not higher than $10^6$ Ω-cm, using 16008A resistivity cell as a test specimen box.

(2) Flexural properties

The flexural strength (kg/cm$^2$) and the flexural modulus (kg/cm$^2$) were measured by means of an Instron type universal tester in accordance with ASTM-D790.

COMPARATIVE EXAMPLES

Molded products were prepared in the same manner as in Example 1 except that instead of Bell Pearl-C2000S, carbon black or nickel-coated mica was used. Their properties were evaluated and the results are shown in Table 1.

TABLE 1

| No. | Amount added (wt %) | | Volume resistivity | Flexural strength | Flexural modulus |
|---|---|---|---|---|---|
| 1 | A | 0 | $2 \times 10^{15}$ | 1200 | 31000 |
| 2 | A | 2.5 | $1 \times 10^{11}$ | 1320 | 33000 |
| 3 | A | 5 upper | $5 \times 10^{8}$ | 1300 | 34800 |
| 4 | A | 10 upper | $8 \times 10^{7}$ | 1280 | 37000 |
| 5 | A | 20 upper | $8 \times 10^{5}$ | 1200 | 39000 |
| 6 | A | 20 intermediate | $6 \times 10^{5}$ | 1160 | 41100 |
| 7 | A | 20 lower | $5 \times 10^{5}$ | 1150 | 42000 |
| 8 | A | 40 upper | $6 \times 10^{4}$ | 1080 | 45000 |
| 9 | A | 40 intermediate | $2 \times 10^{4}$ | 1060 | 45800 |
| 10 | A | 40 lower | $8 \times 10^{3}$ | 1050 | 46500 |
| 11 | B | 5 upper | $5 \times 10^{10}$ | 1030 | 36000 |
| 12 | B | 5 lower | $1 \times 10^{10}$ | 1030 | 36000 |
| 13 | C | 30 upper | $2 \times 10^{12}$ | 1100 | |
| 14 | C | 30 intermediate | $5 \times 10^{10}$ | 980 | |
| 15 | C | 30 lower | $8 \times 10^{5}$ | 960 | |

In Table 1, A represents Bell Pearl C-2000S, B represents carbon black (Ketjenblack EC), and C represents nickel-coated mica.

It is evident from Table 1 that among the molded articles of the present invention (Nos. 2 to 10), No. 2 has a volume resistivity substantially the same as the articles having carbon black incorporated (Nos. 11 and 12), but is superior in the flexural properties.

Further, Nos. 3 to 10 having 5% or more incorporated provide a volume resistivity of $10^8$ or less which can not be attained by carbon black.

Furthermore, in the molded articles of the present invention, fine carbon particles are uniformly dispersed in the molded articles. Accordingly, as compared with the articles having nickel-coated mica incorporated (Nos. 13 to 15), the variation in the properties at various locations is small.

What is claimed is:

1. An antistatic molded article of monomer-cast nylon prepared by the steps comprising
    a) adding to monomer for nylon, an anionic polymerization catalyst, a polymerization initiator and from 2 to 40% by weight based on the molded article, of spherical or substantially spherical fine carbon particles having a specific gravity of from 1.4 to 1.6 and a particle size of from 10 to 25 μm,
    b) casting the mixture into a mold, and
    c) polymerizing it at a temperature of from 120° to 220° C.

2. The antistatic molded article according to claim 1, wherein the monomer-cast nylon is 6-nylon or 12-nylon.

3. The antistatic molded article according to claim 1, wherein the carbon particles are isotropic carbon particles obtained by baking and carbonizing spherical or substantially spherical particles of a phenol formaldehyde resin.

4. The antistatic molded article according to claim 1, wherein the carbon particles have a specific surface area of not more than 10 m$^2$/g.

5. The antistatic molded article according to claim 1, wherein the carbon particles are contained in an amount of at least 5% by weight.

6. The antistatic molded article of claim 1, wherein said monomer-cast nylon is 6-nylon.

7. The antistatic molded article of claim 1, wherein said carbon particles are uniformly dispersed in the molded article.

* * * * *